United States Patent [19]

Steinfelder et al.

[11] 4,430,687
[45] Feb. 7, 1984

[54] TRIM CONDENSER

[75] Inventors: Karl Steinfelder; Ullrich Heisig; Siegfried Schiller, all of Dresden; Dietrich Mehr, Gera; Bernd Thusse, Gera; Klaus Hielscher, Gera, all of German Democratic Rep.

[73] Assignee: VEB Elektronik Gera, Gera, German Democratic Rep.

[21] Appl. No.: 291,897

[22] Filed: Aug. 11, 1981
(Under 37 CFR 1.47)

[30] Foreign Application Priority Data

Aug. 13, 1980 [DD] German Democratic Rep. ... 223285

[51] Int. Cl.³ .............................................. H01G 5/06
[52] U.S. Cl. .................................................... 361/293
[58] Field of Search ................... 361/293, 305, 278; 252/513

[56] References Cited

U.S. PATENT DOCUMENTS

| 1,533,611 | 4/1925 | Respess | 361/293 X |
|---|---|---|---|
| 2,219,921 | 10/1940 | Gerth | 361/293 |
| 2,535,367 | 12/1950 | Minnium | 361/293 |
| 2,585,752 | 2/1952 | Dorst | 361/305 X |
| 3,500,147 | 3/1970 | Hirschberg | 361/293 |
| 3,794,518 | 2/1974 | Howell | 252/513 X |
| 3,872,360 | 3/1975 | Sheard | 252/513 X |
| 4,241,378 | 12/1980 | Dorrian | 361/305 |
| 4,353,106 | 10/1982 | Shirakawa | 361/293 |
| 4,389,696 | 6/1983 | Azuchi | 361/293 |

Primary Examiner—Donald A. Griffin
Attorney, Agent, or Firm—Jordan and Hamburg

[57] ABSTRACT

The invention relates to a trimming capacitor which is used as a passive construction element in electronics. The purpose of the invention is to avoid utilization of the noble metals as electrode material. The task is to find an equivalent material with the same parameters. The task is solved when the structured electrodes comprise Cu/Ni of 30 to 60% Ni, affixed at a thickness of 1.5 to 3 $\mu$m. The roughness depth of the stator surface here is $\leq 0.7$ $\mu$m. The electrodes are affixed to the stator and rotor in the vacuum step by spraying at a high rate with the aid of masks.

11 Claims, 3 Drawing Figures

TRIM CONDENSER

BACKGROUND OF THE INVENTION AND PRIOR ART STATEMENT

The invention relates to a passive electric structural element with an adjustable capacitance value, commonly called a trimming capacitor.

Adjustable capacitors are usually composed of a stator with a sector-shaped ring electrode covering the surface at an angle of about 180°. The connection of the electrode to the armature produced by a soldering connection lies in a depression.

The rotor is composed of high-grade capacitor ceramic and also has a sector-formed ring electrode which is in contact with the rotor shaft through a soldering connection. The stator and rotor are adjusted to each other through the rotor shaft. It is possible to turn the capacitor layers towards each other at the same time by turning the two structural elements in such a way that the capacitance value of the structural element can be set between an upper and a lower limiting value.

Silver is preferred as a manufacturing material for the electrodes, which is affixed through spraying, screen printing or ram pressing, followed by annealing. The electrodes and especially the stator electrodes as in normal ceramic capacitors, must have high electrical conductivity in order to fulfill the required electrical parameters, especially those regarding small angle losses.

Adjustable capacitors must allow a certain number of capacitance value settings so that the stator electrode must also fulfill certain requirements regarding abrasion resistance. If silver is employed as the electrode material, this requirement is fulfilled by relatively thick silver layers in the range of 5 to 10 $\mu$m. Since the stator only fulfills the function of a carrier for the stator electrode, ceramic which has larger surface roughness values opposite the rotor is used for this purpose. Nevertheless, a sufficiently even surface for the stator electrode is obtained through the thickness and the annealing process of the silver layer in conjunction with smoothing of the silver coating.

Silver in the indicated thickness as the electrode material, also completely fulfills the requirements concerning solderability for affixing the connection armatures.

In contrast to capacitors with fixed values, which are generally protected by coverings from the damaging effects of the atmosphere, especially heat and humidity, trimming capacitors should not be covered in order to permit adjustment. The electrodes thus are fully exposed to the damaging effects of the atmosphere. Silver as electrode material has sufficient characteristics in this regard. One definite disadvantage in using silver as an electrode material is its high price, which initially affects the price of the structural element in a distinctive manner. For this reason, other electrode materials have already been proposed for capacitors with fixed values, such as, for instance, nickel or copper, which, however, do not fulfill even one of the conditions required for trimming capacitors.

Thus, for instance, copper is not sufficiently resistant to wear and is also not corrosion-proof. Nickel requires the application of corrosive soldering fluxes when soldering the armatures, which leads to substantial deterioration of the loss angle.

The purpose of the invention is to create a trimming capacitor which can be produced economically without employing noble metals.

SUMMARY OF THE INVENTION

This invention has the purpose of employing a suitable electrode material, free from noble metals, while fulfilling the requirements concerning formation of the structural element at the same time. The electric parameters must be maintained.

According to this invention, the purpose of structurally affixing the electrodes on a stator and rotor constructed of artificial material by previously affixing an adhesive layer, is achieved in that the electrodes are made from a copper-nickel alloy, wherein the Ni content of this alloy lies between 30% and 60%. The thickness of the electrodes lies between 1.5 $\mu$m and 3 $\mu$m. The roughness value of the stator surface is reduced through lapping to $R_a \leq 0.7$ $\mu$m.

It is advantageous to affix the electrodes and the adhesive layer through spraying at a high rate since the surface is made smoother by this coating process.

Further, it is advantageous to use a copper-tin alloy as solder for connecting the armatures, which are manufactured in a known manner, since, in this case, no trans-alloying of the coating occurs even when thin electrodes are involved so that a safe soldering connection to the armatures is also assured in the technological finishing process.

The copper-nickel alloys of the electrodes in the indicated composition represent a distinctly resistant material (for instance, constants with Cu/Ni 56/44). Surprisingly, when such materials are used for manufacturing electrodes, the requirements concerning electric conductivity are also fulfilled. A condition herein, however, is that the roughness value of the surface to be coated, especially the roughness of the stator surface, does not surpass the value of 0.7 $\mu$m.

The copper-nickel alloy in the noted composition fulfills the requirements concerning resistance to corrosion and can be soldered by employing less corrosive soldering fluxes. The layer for the electrodes should be affixed under such defined physcial conditions that the layer will practically have the same specific resistance as the compact material. These conditions include that the material be initially separated at a high condensation rate and at a low residual gas pressure in a vacuum. By reducing the roughness value of the surface, conductivity of the layer serving as the electrode can be further increased by a factor of 2 to 3 so that the required conductivity for the electrode will already be attained with a thickness layer of 1.5 to 3 $\mu$m. The lower margin of the thickness layer herein is fixed by the minimum required conductivity for the sake of low losses in the capacitor. The upper margin is determined by the required structural precision of the electrodes. This depends largely on the thickness of the layer at the spraying of the layer with the aid of masks. Additionally, the economics of manufacture is influenced by the layer thickness when exclusively utilizing vacuum coating processes for affixing the electrodes.

Layers of Cu or Ni, in contrast to Cu/Ni alloys in the noted thickness range, do not have sufficient resistance to corrosion to fulfill requirements after repeated adjustment of the capacitance value. Trimming capacitors with electrodes of the alloys of this invention, in combination with a lapped surface, can fulfill these requirements.

Consequently, it is most advantageous to proceed to the affixation of the copper-nickel alloy on the rotor and stator by spraying at a high rate with the Plasmatron. This process is especially suitable for the separation of alloys and ensures the production of layers with sufficient conductivity in combination with the attainable high condensation rates. Adhesion of the layer on the substrate is achieved through affixation of an additional adhesive layer, wherein high adhesion resistance values are especially attained if the adhesive and the conductive layers are produced in the vacuum step.

The requirements concerning the structural precision of electrodes are lower for adjustable capacitors than for fixed-value capacitors in view of the adjustable capacitances. Additionally, these construction elements must have an even surface in view of their mode of functioning. For this reason, the required structural precision at the relatively large thickness layer of 3 $\mu$m is still attained even under spraying at a high rate over masks.

DETAILED DESCRIPTION OF A PREFERRED EMBODIMENT

Figure 1:
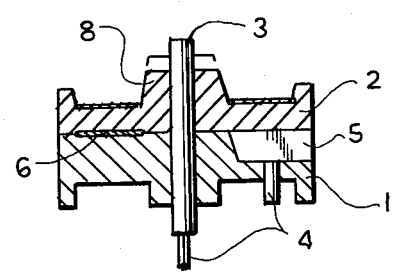
FIG. 1 is a sectional view through a trimming capacitor.
Figure 2:
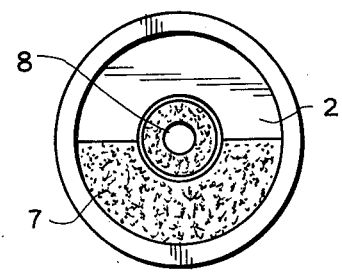
FIG. 2 is a top view of the rotor.
Figure 3:
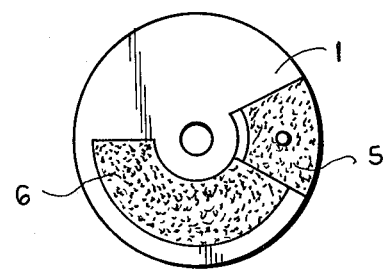
FIG. 3 is a top view of the stator.

The adjustable capacitor comprises a stator 1 made from KER 221, rotor 2 of capacitor ceramic N 750, rotor shaft 3 and the soldering connections 4 for the armatures. The whole surface of stator 1, excluding the depression 5 for the soldering connection 4, has been processed by lapping. The roughness value is 0.5 $\mu$m after this operating procedure. The stator electrode 6 comprises an angle range of about 160° and is at a corresponding distance from the middle boring. The stator electrode 6 continues into depression 5 where it is connected with the armature through soldering connection 4.

The rotor 2 also has a sector-shaped rotor electrode 7 with an electrode angle of about 180°. The middle protrusion 8 is coated on its whole circumference since the contact to rotor shaft 3 is established here through soldering.

Electrodes 6, 7 comprise the alloy Cu/Ni 56/44 and have a layer thickness of 2 $\mu$m. Manufacture of these electrodes 6, 7 is effected through spraying at a high rate with the Plasmatron. The surfaces of rotor 2 and stator 1 that are not to be coated during the coating procedure are covered with masks. For this purpose, they are pressed by a spring onto the stiff masks. Residual gas pressure during coating is $5 \cdot 10^{-4}$ Pa. The condensation rate is 1 $\mu$m/min. An adhesive layer of the alloy Ni/Cr 80/20 with a thickness of 50 nm is affixed in the same vacuum cycle before affixation of the copper-nickel layer.

The soldering of the armatures and the connection of the rotor shaft 3 to rotor 2 is effected by a copper-tin solder LSn60Cu1 in the usual manner (up to 2% Cu).

It is not necessary to employ a high-grade ceramic in order to achieve the required low roughness value for the stator surface. These requirements may also be fulfilled by employing the kinds of ceramic that have been previously used, provided the surface of the stator is lapped after sintering.

We claim:

1. A trimmer capacitor, adapted to be connected with an armature, comprising
    a stator with a surface having a roughness $\leq$ about 0.7 $\mu$m,
    a rotor with a surface having a roughness value $\leq$ about 0.7 $\mu$m,
    a first adhesive layer applied to a portion of said stator surface,
    a second adhesive layer applied to a portion of said rotor surface,
    a first electrode applied to said first adhesive layer on said stator surface, said electrode comprising a copper-nickel alloy of from 1.5 $\mu$m to 3 $\mu$m thickness and 30% to 60% nickel content,
    a second electrode applied to said second adhesive layer on said rotor surface, said electrode comprising a copper-nickel alloy of from 1.5 $\mu$m to 3 $\mu$m thickness and 30% to 60% nickel content,
    a rotor shaft extending substantially through the center of the rotor and the stator,
    a first soldering connection between said stator and armature, and
    a second soldering connection between said rotor shaft and armature.

2. The capacitor of claim 1 in which both the first and second adhesive layers comprise a nickel-chromium alloy.

3. The capacitor of claim 2 in which a portion of said stator surface is provided with a depression, said first electrode extending into said depression and contacting said first soldering connection.

4. The capacitor of claim 3 in which said soldering connections comprise a copper-tin alloy of up to about 2% copper content.

5. The capacitor of claim 4 in which the second electrode forms an arc of about 180°.

6. The capacitor of claim 5 in which the first electrode forms an arc of about 160°.

7. The capacitor of claim 6 in which both the first and second electrodes are applied by intensive spraying in a vacuum.

8. The capacitor of claim 7 in which both said first and second adhesive layers are initially applied in a vacuum.

9. The capacitor of claim 8 in which portions of the stator and rotor not to be sprayed are covered with a mask.

10. The capacitor of claim 9 in which the stator surface and rotor surface are lapped before the first and second adhesive layers are applied.

11. The capacitor of claim 10 in which the depression in the stator surface is not lapped.

* * * * *